Figure 1:
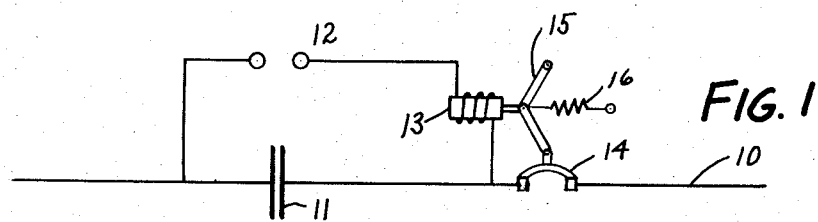

Sept. 25, 1951 L. PODOLSKY 2,569,133

SERIES CAPACITOR PROTECTIVE SYSTEM

Filed Oct. 15, 1948

LEON PODOLSKY
INVENTOR.

BY *Arthur G. Connolly*
his attorney

Patented Sept. 25, 1951

2,569,133

UNITED STATES PATENT OFFICE 2,569,133

SERIES CAPACITOR PROTECTIVE SYSTEM

Leon Podolsky, Pittsfield, Mass., assignor to Sprague Electric Company, North Adams, Mass., a corporation of Massachusetts Application October 15, 1948, Serial No. 54,596

4 Claims. (Cl. 175—294)

This invention relates to protective devices for series capacitors and more specifically refers to an improved series capacitor protective system.

The protection of a capacitor to be used in series with a power or transmission line for the control of voltage on the line is an extremely difficult problem which has never been satisfactorily solved. The cost of protecting the capacitor is in most cases so high as to make the total installation economically prohibitive thus leading to the widespread use of cumbersome mechanical voltage regulators. Series capacitors, however, could be used in many applications at a great cost savings over mechanical voltage regulators if the protective means were sufficiently simple and inexpensive.

Normal operation of a series capacitor will develop across it a maximum effective voltage which is the product of the capacitor impedance and the load current flowing in the circuit. Under fault or short circuit conditions on a line, the circuit current will rise to very high values, producing excessive voltages across the capacitor which exceed the safe maximum voltage rating of the capacitor. Likewise, lightning and switching surges on the line may cause brief excessive voltages across the capacitor, often exceeding the maximum safe rating.

The simplest and lowest cost means of protecting the capacitor against excessive voltages is to shunt the capacitor with a spark gap. The use of a spark gap is well known in the art. However, it is subject to the disadvantage that a short time high voltage transient may cause the gap to break down, with the circuit power current following through and maintaining the arc across the gap. Although this short circuits and protects the capacitor, it removes it completely from the circuit for control purposes. In addition, the maintained arc will in a short time destroy the spark gap, unless the circuit is broken by interrupting devices. Since the high voltage transient which breaks down the gap may be of very short duration, particularly if induced by lightning, the transient current may not cause the usual circuit breakers or interrupting devices to operate. The gap therefore will arc to destruction, following which, the next surge will destroy the capacitor, because it no longer has gap protection.

Many systems have been proposed to overcome this problem. One system involves a spark gap and a bellows operated switch. After arcing across the gap, the follow through current is caused to flow through a metal bellows filled with a vaporizable liquid. The heating of the bellows by the current causes the liquid to vaporize and expand the bellows, and this expansion operates a switch which short circuits the spark gap and capacitor. Although this system does protect the gap and the capacitor, it is complicated and expensive.

It is an object of this invention to overcome the foregoing and related disadvantages. A further object is to produce an improved yet simple series capacitor protective system. Additional objects will become apparent from the following description and claims.

These objects are attained in accordance with the present invention which is directed to a transmission line employing a series capacitor which is shunted by a spark gap in series with a low impedance tripping coil, said tripping coil actuating means for time-delayed opening and reclosing of the capacitor circuit. In one of its limited embodiments, my invention is concerned with a series capacitor protective system comprising a series capacitor shunted by a normally open switch, and by a spark gap in series with a low impedance tripping coil, said coil actuating means for closing and reopening said switch. In one of its preferred embodiments my invention is concerned with a series capacitor protective system which consists of a series capacitor in an A. C. transmission line, said capacitor being shunted by a normally open switch and by a control circuit which consists of a spark gap in series with a low resistance value resistor, said resistor being shunted by a low impedance tripping coil and a D. C. rectifier, said tripping coil actuating means for time delayed opening and reclosure of said switch.

Figure 2:
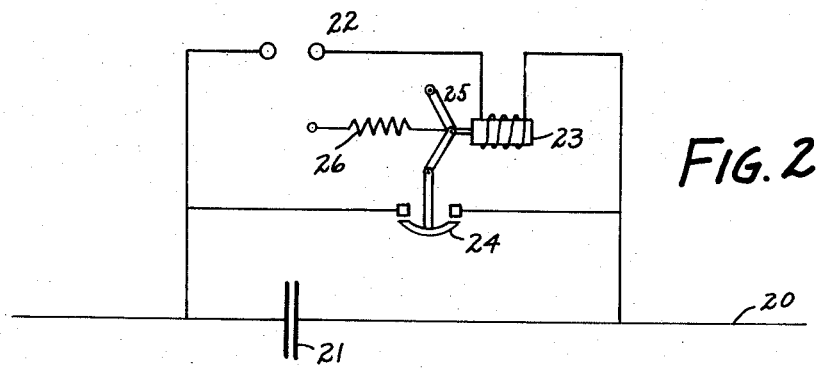
Figure 3:
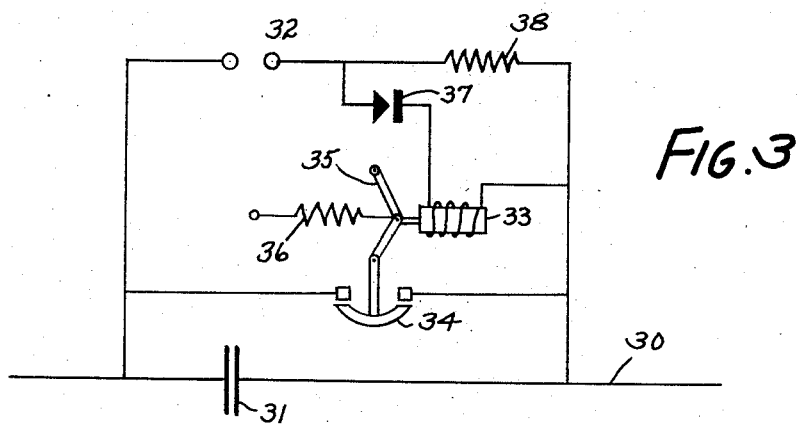

The invention will be further described with reference to the appended drawing wherein Figure 1 illustrates a schematic diagram of one of the embodiments of my invention, Figure 2 represents a schematic electric circuit of another embodiment of my invention, and Figure 3 represents the schematic electrical circuit of another and preferred embodiment of my invention.

Referring more specifically to Figure 1, 10 represents a transmission line such as used for high voltage distribution in rural and cross country systems. Capacitor 11 is in series therewith and performs the function of a voltage regulation device. The capacitor 11 is shunted by spark gap 12 in series with tripping coil 13. The spark gap is set to arc at the voltage level above which the capacitor may fail. Tripping coil 13 possesses a low impedance, and actuates switch 14 which is in series with capacitor 11. Switch 14 is normally closed, and is maintained in such a position by a closure spring 16 or similar device. The opening of switch 14 may be instantaneous or time delayed, preferably the latter. The operation of this circuit may be described as follows:

Any short circuit or fault on the transmission line 10, which would cause an excessive voltage to appear across the capacitor 11, will cause the spark gap 12 to protect and by-pass the capacitor from the circuit. The tripping coil 13, due to the passage of current therethrough, will actuate switch 14 to open the line itself. Preferably the tripping coil switch is operated with a time delay mechanism, as with a motor driven timer or by hydraulic means, so that the conventional circuit breakers used on the power line for protection, or the substation breakers which normally operate in not more than 20 cycles, will clear the line, and the arc on the protecting gap will be extinguished. The time delay is preferably on the order of 10 seconds. The foregoing does not require opening of the line at the capacitor.

As an instantaneous transient or lightning surge produces a voltage high enough to break down the gap without an excessive current being drawn by the circuit, the tripping coil 13 which is set to operate at the normal rated circuit current, will be actuated by spark gap 12. With the 10 second delay preferably provided for the tripping coil 13, all other protective devices would first have a chance to clear before coil 13 would open the main circuit switch 14. After opening and suitable time delay, the main switch 14 would be automatically reclosed by spring 16. Since the gap break down was caused by an instantaneous transient surge which would already have passed, the closing of the switch reestablishes the power supply. The reclosure may be designed to operate as rapidly as desired by the circuit application.

Referring now to Figure 2, the principal distinction between this system and the system described in Figure 1 is that line 20, the main circuit line, is at all times closed or effective in operation. Capacitor 21 is shunted by spark gap 22 and tripping coil 23, and is also shunted by main switch 24, which is normally open. Any short circuit or fault on the line which would cause an excessive voltage to appear across the capacitor will cause the spark gap to break down and take the capacitor out of the circuit, low impedance tripping coil 23 actuates switch 24 through closure element 25 against the urging of hold-open device 26, so that continued presence of the high transient will by-pass spark gap 22 by closing switch 24. Thus spark gap 22 will not burn out. The time-delay provided for the operation of tripping coil 23 and its associated assembly members 25 and 26 may be on the order of one to ten seconds. It is apparent that line 20 will at all times be in operation through the series capacitor assembly irrespective of the action of main station or substation breakers. Normally, switch 24 is open, spark gap 22 is inactive and current flow occurs through capacitor 21. If a fault occurs, spark gap 22 arcs and carries the current for a short period while thereafter the current is carried through the branch of the circuit which includes switch 24. A suitable reopening time may be selected for switch 24. In most cases the reopen time may be from 1 to 10 seconds with a choice of one or more reopenings without permanent closure. If the excessive transient is still present after reopening of switch 24, spark gap 22 will again arc, reactuating the short circuiting function through tripping coil 23. Permanent reopening action of the tripping and switching assembly 23, 24, 25 and 26 makes it unnecessary for a lineman to mechanically reactivate the device and simplifies the location of any failure or fault on the line.

The application of the above circuit breaker to the protection of a series capacitor installation by the insertion of the operating coil of the circuit breaker in series with a spark gap, and with the contacts of the circuit breaker operating to protect the capacitor installation when the current flows for any period of time through the spark gap, may suffer from a limitation when very small load currents exist in the circuit. Under such conditions, an impulse or transient on the line may break down the spark gap and the very small normal load current would then continue to flow through the ionized gap thus formed. The design of a circuit breaker coil 23 to operate on very small currents of 5 amperes or less becomes very difficult due to the high ampere turn requirements for operating the mechanical system of the circuit breaker. In the design of operating coils for such conditions, it has been found that many turns of wire are necessary and that the impedance of such coils reaches so large a value that the voltage drop across this impedance under even moderate fault current conditions is too high. Accordingly, even though the spark gap breaks down supposedly to protect the capacitor the net voltage drop across the spark gap and the high impedance coil in series with it, may be too great for the capacitor to withstand.

This situation may be a serious limitation for the application of this system to rural conditions where very small off peak load currents do exist. Normal line circuit breakers, commercially available, have their smallest operating coils with 5 ampere rating and require a minimum 10 ampere current to trip. Such circuit breakers have operating coils of approximately 1 ohm D. C. resistance and 8 ohms reactance at 60 cycles A. C. When the operating coils are redesigned for 1 ampere operation the impedance becomes approximately 200 ohms and results in the condition outlined above. Referring now to Figure 3, a preferred embodiment of the invention, I have discovered a system which overcomes this difficulty completely and permits a standard 5 ampere circuit breaker design to be applied to the protection of series capacitors for low current operating conditions of any magnitude. Series capacitor 31 is located in transmission line 30. In series with the spark gap 32 is copper or selenium rectifier 37 and circuit breaker coil 33. The latter two elements are shunted by low resistor 38. Coil 33 actuates circuit breaker 35 with normally open switch 34. This switch shunts capacitor 31. A spring or other reopening device 36 opens switch 34 after a suitable time delay as discussed in connection with Figure 2 and Figure 1. This system operates by taking the A. C. voltage drop across the resistor 38 when a current is flowing through it and spark gap 22, rectifying this voltage drop with fixed rectifier 37 and applying the resultant D. C. voltage to operating coil 33 of circuit breaker 35. The circuit breaker coil 33 has a very low D. C. resistance in comparison to its A. C. impedance and the circuit breaker 35 will trip on the fixed current value with either A. C. or D. C. Since the resistance is only about 10% of the total impedance, the required D. C. voltage to produce the operating current need only be about 10% of the A. C. value which would normally be required. Thus it is possible to use a resistor 38 which has a resistance value only about $\frac{1}{10}$ of the value of the impedance which would be required if the circuit breaker coil were directly in series with the gap as in Figure 2. This relatively low resistance in series with the gap does not produce voltage drops under fault current conditions which are dangerous to the capacitor, yet it does permit a large enough voltage drop which, when rectified to D. C., will produce a satisfactory tripping current for the circuit breaker 35.

It can be seen from the foregoing that the several embodiments of my invention are simple, do not interfere with the timing or operation of any other safety devices normally used to protect the line, and yet provide adequate protection for the capacitor, the spark gap, and the line. This invention has the further advantage that a very low cost capacitor and spark gap may be used with a circuit recloser of modified design.

My invention is, of course, not limited to any specific type of power distribution system, but is operable over a wide range of voltage and current conditions.

As many apparently widely different embodiments of this invention may be made without departing from the spirit and scope hereof, it is to be understood that the invention is not limited to the specific embodiments hereof, except as defined in the appended claims.

I claim:

1. In an alternating current transmission line system having a capacitor connected in series in the line, a capacitor protecting combination including a capacitor-shunting control circuit having a spark gap in series with a low impedance element, and a protecting circuit including a rectifier and a tripping device connected in series across the low impedance element to respond to abnormal off-peak transmission line currents having magnitudes sufficient to cause arcing across said gap, said protecting circuit including arc extinguishing means connected to extinguish said arcing in response to operation of said tripping device.

2. The combination as defined by claim 1 in which the low impedance element is a resistor.

3. The combination as defined by claim 1 in which the arc extinguishing means is a capacitor shorting switch.

4. The combination as defined by claim 1 in which the tripping device includes a relay with an actuating winding and normally open contact elements, the contact elements being connected across the capacitor to short it out when the relay is actuated, and the winding being in series with the rectifier to present essentially only the resistance of this winding to rectified alternating currents of the desired low magnitudes impressed by voltages appearing across the low impedance element.

LEON PODOLSKY.

REFERENCES CITED

The following references are of record in the file of this patent:

UNITED STATES PATENTS

| Number | Name | Date |
|---|---|---|
| 1,900,495 | Gay | Mar. 7, 1933 |
| 2,284,876 | Marbury | June 2, 1942 |
| 2,323,702 | Berkey | July 6, 1943 |
| 2,363,898 | Partington | Nov. 28, 1944 |
| 2,366,493 | Crary | Jan. 2, 1945 |
| 2,389,007 | Strang et al. | Nov. 13, 1945 |
| 2,401,009 | Marbury | May 28, 1946 |